May 14, 1957 R. J. DUCKWORTH 2,791,894
ANTI-FRICTION JOINT
Filed Dec. 8, 1955
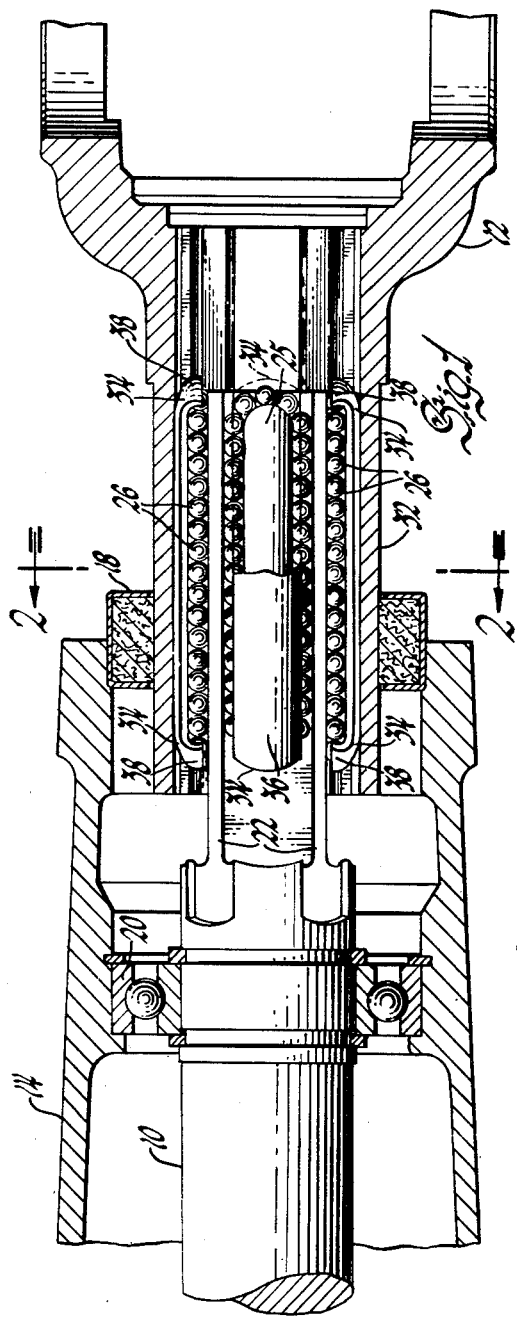
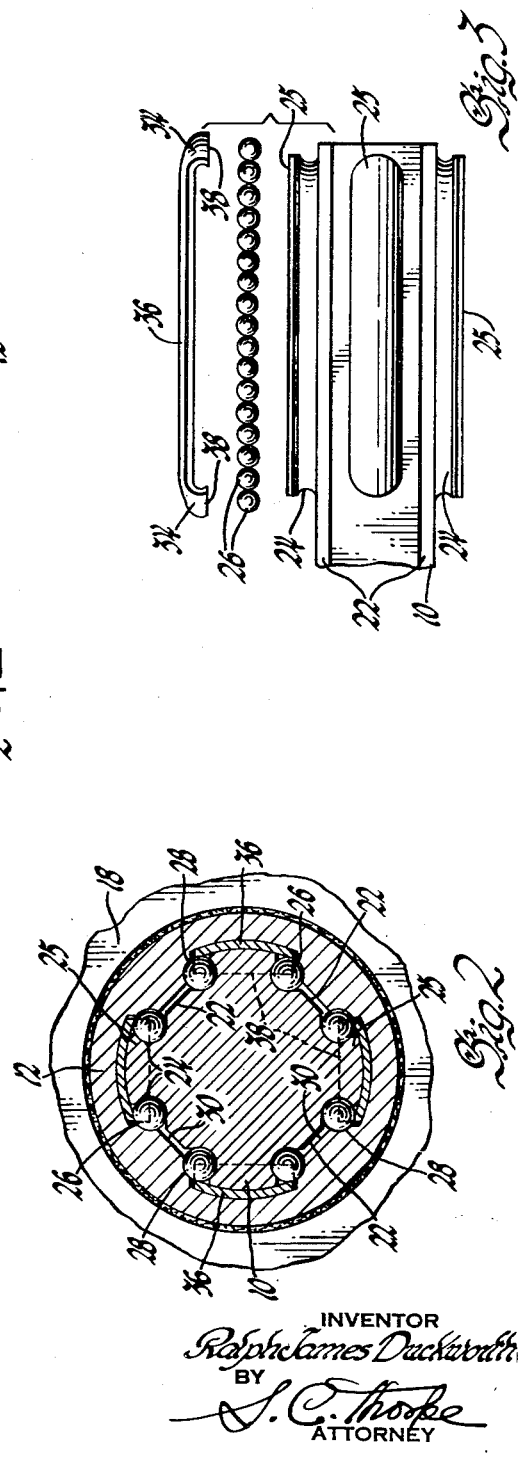
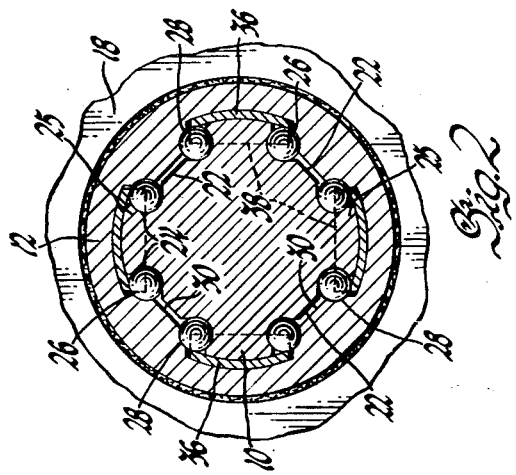
INVENTOR
Ralph James Duckworth
BY
ATTORNEY

2,791,894

ANTI-FRICTION JOINT

Ralph James Duckworth, Lansing, Mich., assignor to General Motors Corporation, Detroit, Mich., a corporation of Delaware Application December 8, 1955, Serial No. 551,866

6 Claims. (Cl. 64—23)

This invention relates to a slip joint comprising anti-friction elements and in its most particular aspect concerns a joint of this type which permits linear movement of the joined parts while preventing rotary movement thereof. The invention represents an outgrowth or, more accurately, a solution of a problem of long standing in the automotive industry—namely, how to prevent the noise which occurs when the static friction in the splined joints of an automobile propeller shaft is overcome by an axial force acting thereon (derived as from a bump or the like in the road) at the moment high torque is being transmitted through the shaft from the engine to the drive wheels. This noise which is manifested as a "clunk" is considered most objectionable in many quarters, and especially in the passenger car field.

The indicated problem has become especially acute of recent years due to the general adoption of high torque engines and due further to the increased slip between the shaft sections resulting from changes which have been in the geometry and design of rear suspension systems to obtain lower floors, desirable as providing a lower car silhouette.

The object of the invention being implicit in the foregoing, reference will now be made to the accompanying drawings illustrating the same in its preferred embodiment. In the drawings, Figure 1 is a longitudinal fragmentary section showing parts of an automobile propeller shaft as fabricated and assembled according to the invention;

Figure 2 is a transverse section on the line 2—2 in Figure 1; and

Figure 3 is an exploded view illustrative of an assembly step.

Referring first to Figure 1, the numeral 10 indicates what may be assumed as the driving component of the automobile propeller shaft; while the numeral 12 denotes the driven component, the same being represented as a part of a universal joint, necessarily incorporated in any such shaft. Surrounding the shaft 10 is a tubular housing 14 closed by an annular seal at 18. Shaft 10 turns in a ball bearing 20 having shouldering engagement with the housing 14. Rightward of the bearing the shaft 10 is reduced in diameter and is splined. Between each adjacent pair of the splines 22 is a land 25 having a groove 24 therearound in which are seated anti-friction elements, specifically balls 26. These balls additionally seat in complementary grooves 28 formed in internal lands 30 carried by elongated portion 32 of the driven propeller shaft component 12.

The groove 24 of each land 25, with the grooves 28 at the opposing edges of the adjacent internal lands 30, provide two straight paralleling courses for the corresponding train of balls 26. The path followed by the balls also comprise curved courses 34 (Fig. 1) at either end of the land 25, where the groove 24 in the land is suitably arcuate. To retain the balls as they negotiate the curves there is supplied an elongated cover member 36, which has a length slightly exceeding that of the land 25 and which overhangs the land at its ends. These overhanging portions 38 are appropriately deformed so as to provide for smooth transfer of the balls from one of the straight courses to the other.

In the assembly of the slip joint (Fig. 3) the cover 36 is held firmly in place while the balls are pushed into the groove 24 at one side of the land 25 with deflection of the cover. As the operation continues, the necessary number of balls are forced into the enclosures provided by the overhanging portions 38. With all of the balls in place, the assembly operation is completed by inserting the end of the shaft 10 with the ball assembly thereon into the component 12, more accurately, into the elongated portion 32 thereof. Incident to this final step, the seal 18 becomes suitably seated in the end of the housing 14.

By means of the illustrated construction the static friction between the driving and driven components of the joint is markedly reduced, and as a consequence a high torque load transmitted through the joint from either end thereof at the moment of slipping of the joint will not cause the objectionable noise heretofore experienced.

Having thus described and illustrated my invention, what I claim is:

1. A telescopic slip joint comprising anti-friction elements moving in an endless path incident to slipping of the joint, this path having two substantially straight courses and two curved courses and being provided by a groove formed in the wall of a land carried by one of the components of the joint, by complementary grooves formed in a pair of lands carried by the other component of the joint and between which said first land is disposed, and by an elongated cover member positioned between said components and deformed at its ends to secure the anti-friction elements as they negotiate said curve courses.

2. A telescopic slip joint comprising anti-friction elements moving in an endless path incident to slipping of the joint, this path having two substantially straight courses and two curved courses and being provided by a groove formed in the wall of a land carried by the male component of the joint, by complementary grooves formed in a pair of internal lands carried by the female component of the joint, said first-mentioned land being disposed between said pair of lands, and by an elongated cover member positioned between said components and deformed at its ends to overhang the ends of said first land thereby to secure the anti-friction elements as they negotiate said curved courses.

3. A telescopic slip joint comprising anti-friction elements moving in an endless path incident to slipping of the joint, this path having two substantially straight courses and two curved courses and being provided by a groove formed in the wall of a land carried by the male component of the joint, by complementary grooves formed in a pair of internal lands carried by the female component of the joint, said first-mentioned land being disposed between said pair of lands, and by an elongated cover member positioned between said components and deformed at its ends to overhang the ends of said first land thereby to secure the anti-friction elements as they negotiate said curved courses, said grooves in said pair of internal lands being located along the opposed edges of these lands.

4. An automobile propeller shaft including driving and driven components connected through a slip joint characterized in that one of said components is telescoped into the other and in that there is disposed between said components a train of anti-friction elements which incident to relative axial displacement of said components move in an endless path, this path having two substantially straight courses and two curved courses and being provided by a groove formed in the wall of a land carried by one of said components, by complementary grooves formed in two adjacent lands carried by the other of said components, said first land being disposed between said last-mentioned lands, and by an elongated cover member positioned between said components and deformed at its ends to secure the anti-friction elements as they negotiate said curved courses.

5. An automobile propeller shaft including driving and driven components connected through a slip joint characterized in that one of said components is telescoped into the other and in that said components are respectively externally and internally splined and still further characterized in that there is disposed between said components a train of anti-friction elements which incident to relative axial displacement of said components move in an endless path, this path having two substantially straight courses and two curved courses and being provided by a groove formed in the wall of a land carried by one of said components between a pair of its splines, by complementary grooves formed in two adjacent splines of the other of said components, said land being disposed between said last-mentioned splines, and by an elongated cover member positioned between said components and deformed at its ends to secure the anti-friction elements as they negotiate said curved courses.

6. An automobile propeller shaft including driving and driven components connected through a slip joint characterized in that one of said components is telescoped into the other and in that there is disposed between said components a train of anti-friction elements which incident to relative axial displacement of said components move in an endless path, this path having two substantially straight courses and two curved courses and being provided by a groove formed in the wall of a land carried by one of said components, by complementary grooves formed in two adjacent lands carried by the other of said components, said first land being disposed between said last-mentioned lands, and by an elongated cover member positioned between said components and deformed at its ends to secure the anti-friction elements as they negotiate said curved courses, said grooves in said adjacent lands carried by the said other of said components being located along the opposed edges of these lands.

References Cited in the file of this patent
UNITED STATES PATENTS 1,918,108   Jonkhoff _____ July 11, 1933

FOREIGN PATENTS 975,115   France _____ Oct. 11, 1950